United States Patent [19]

Trahan

[11] Patent Number: 4,513,478
[45] Date of Patent: Apr. 30, 1985

[54] CRAB MEAT EXTRACTING DEVICE

[76] Inventor: Fred Trahan, Rte. 4, Box 225, Beaumont, Tex. 77705

[21] Appl. No.: 484,989

[22] Filed: Apr. 14, 1983

[51] Int. Cl.³ .............................................. A22C 29/02
[52] U.S. Cl. ............................................ 17/71; 17/76
[58] Field of Search .................. 17/71, 72, 73, 74, 75, 17/76; 30/120.2; 100/156, 178, 210, 155 R, 293, 160, 233

[56] References Cited

U.S. PATENT DOCUMENTS

| | | | |
|---|---|---|---|
| 2,373,057 | 4/1945 | Shinn | 100/233 |
| 2,659,930 | 11/1953 | Jagger | 17/73 |
| 2,949,078 | 8/1960 | Reed | 100/233 X |
| 3,388,422 | 6/1968 | Benoit | 17/71 |
| 3,921,256 | 11/1975 | Huebotter | 17/71 |
| 4,202,077 | 5/1980 | Martin, Sr. | 17/73 |

Primary Examiner—Willie G. Abercrombie
Attorney, Agent, or Firm—Kenneth D. Baugh

[57] ABSTRACT

A Crab Meat Extracting device 10 is provided including a base 12 and a roller support member 14 coupled to the base. The roller support member 14 is formed with a semi-circular tracking surface 16. A plurality of upwardly projecting teeth 18 are formed on the tracking surface 16. A roller 20 is pivotably mounted adjacent to the tracking surface 16. A plurality of downwardly projecting teeth are formed between the roller 20 and roller support member 16 in alignment with and spaced from the plurality of upwardly projecting teeth 18. When crab 40 is placed in the space the roller 20 can be pivoted over the tracking surface 16 to remove the meat from the crab.

6 Claims, 7 Drawing Figures

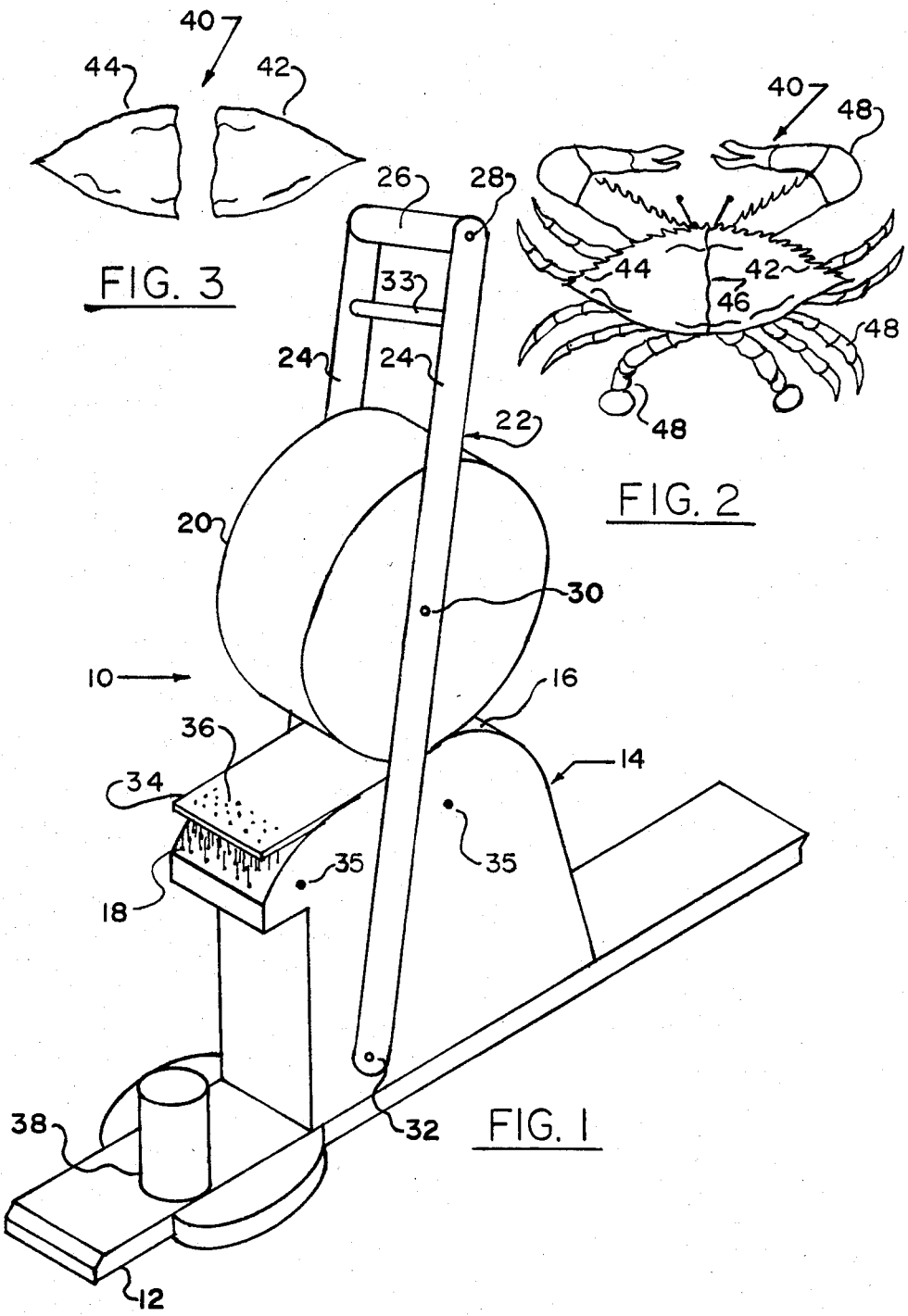

FIG. 6
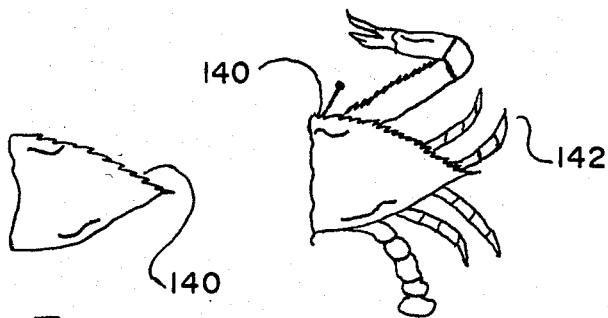
FIG. 7
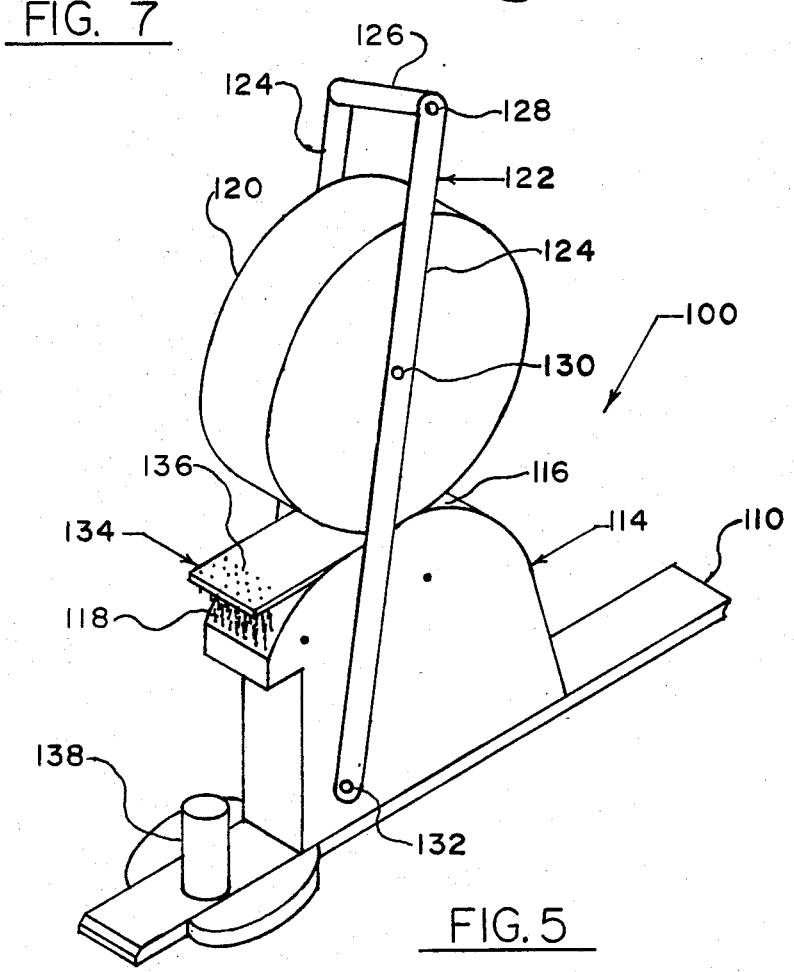
FIG. 5

CRAB MEAT EXTRACTING DEVICE

TECHNICAL FIELD

The invention relates to a device for removing meat from crabs and more particularly to a device for extracting meat from the body of a crab.

Crabs have for sometime been a very popular seafood dish for many. The reason for this popularity has to be the tastiness of the meat of the crab. However some effort is required to enjoy this tasty dish. That is, as is well known the meat of the crab is protected by an outer shell. This outer shell can present an interesting obstacle for those trying to extract the meat therefrom. Because crab is so well protected it can be a rather tedious process for those removing the meat from the shell manually.

Therefore an apparatus for allowing easier removal and access to the meat of the crab is desirable.

BACKGROUND ART

Attempts have been made to provide apparatus that will facilitate removal of the meat from the crab. One arrangement is illustrated in U.S. Pat. No. 3,388,422. This arrangement discloses a vertically upstanding structure including a press arm which is activated to move by a foot pedal to engage the crab. The arm is pivotably mounted so that it can be pivoted by hand to roll over and squeeze meat from the crab. U.S. Pat. No. 392,156 discloses another apparatus which includes a roller that squeezes the crab between the roller and a flat base surface.

Although these devices facilitate removal of the meat from the crab shell, because of their structure they can be rather expensive and even difficult to use.

DISCLOSURE OF INVENTION

This invention relates to a device for extracting meat from a crab. The crab meat extracting device in accordance with this invention includes a base member having a roller support member formed thereon. The roller support member of the crab meat extracting device is formed with a tracking surface thereon. A plurality of upwardly projecting teeth members are formed on the tracking surface of the roller support member. A roller is provided and pivotably mounted adjacent to the tracking surface of the roller support member.

A plurality of downwardly projecting teeth members are formed between the roller and the roller support member adjacent to, spaced from and in alignment with the plurality of upwardly projecting teeth members. As a result when a crab is placed in the space between the projecting teeth members on the roller support member meat can be extracted therefrom by pivoting the roller over the tracking surface.

BRIEF DESCRIPTION OF THE DRAWING

The details of the invention will be described in connection with the accompanying drawing in which:

FIG. 1 is a perspective view of the preferred embodiment of the invention.

FIG. 2 is a top view of a crab from which meat will be extracted in accordance with the principles of this invention.

FIG. 3 is a view of portions of the crab illustrated in FIG. 2.

FIG. 5 is a prospective view of a second embodiment of the invention.

FIG. 6 is a top view of a half crab from which meat will be extracted in accordance with principles of the second embodiment of the invention.

FIG. 7 is a view of portions of the crab illustrated in FIG. 6.

BEST MODE FOR CARRYING OUT THE INVENTION

Figure 4:
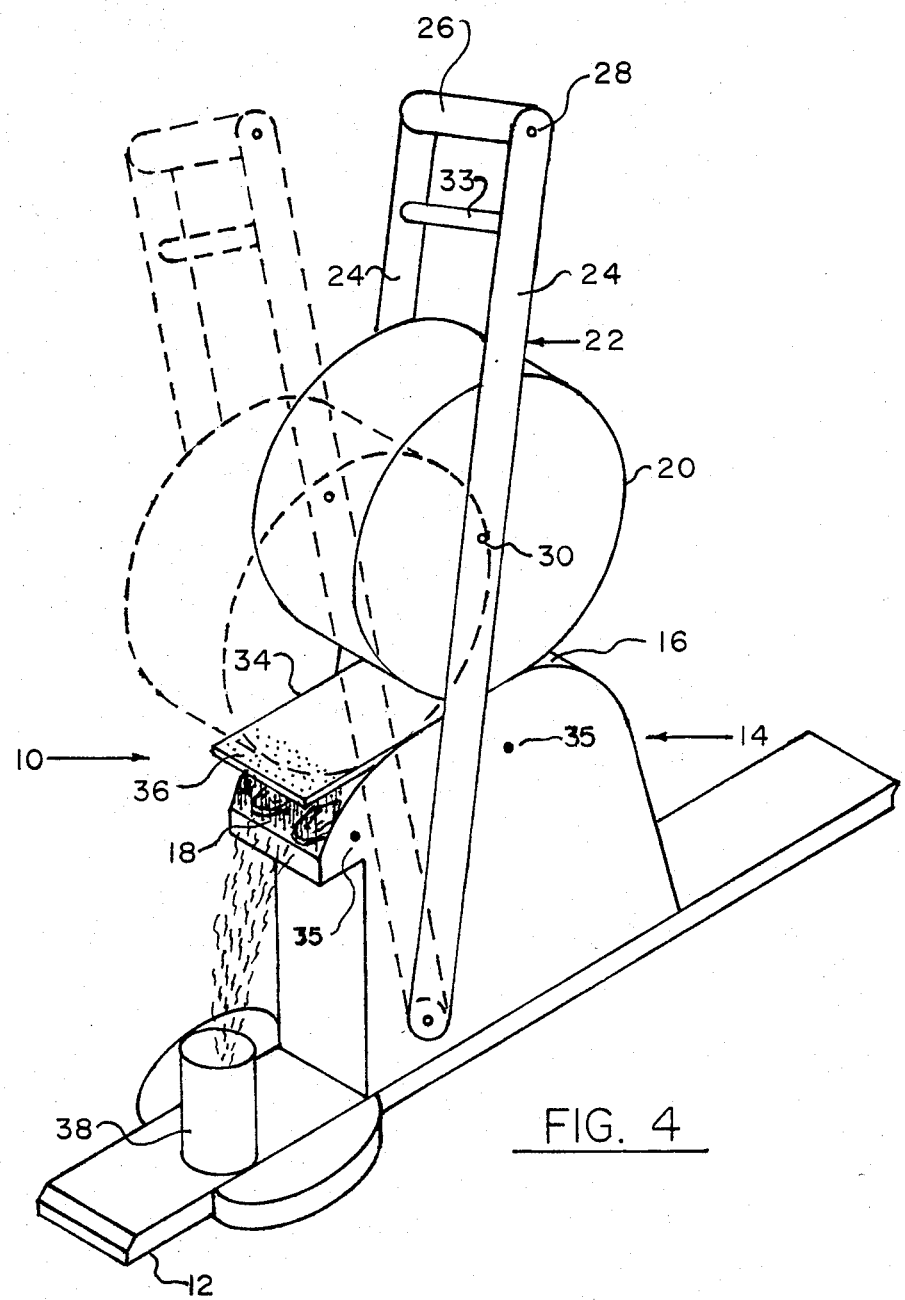
FIG. 4 is a prospective view of the preferred embodiment of the invention with the roller of the invention pivoted to an operating position.

Referring to FIG. 1 a Crab Meat Extracting device 10 is provided with a base member 12. The base member 12 is formed of a light weight material such as for example wood or some other simular material. A roller support member 14 is coupled to the base member 12 at one end thereof. The roller support member 14 includes a semi-circular tracking surface 16 which is formed thereon at an end opposite the base member 12. The roller support member 14 is formed of the same material as the base 12 and may have a width for example of 6 inches.

A plurality of upwardly extending projections or protrutions 18 are formed on the tracking surface 16 of the support member 14. The projections 18 are formed of a material which will facilitate the extraction process such as for example stainless steel.

A roller 20 is pivotably mounted by a roller arm 22 adjacent to and in engagement with the tracking surface 16 of the roller support member 14. The roller 20 may be for example 8 inches in diameter and may have a width of 6 inches which corresponds with the width of the roller support member 14. Similarly the roller 20 may be made of wood or other suitable light weight material just as the roller support member 14.

The roller arm 22 includes a pair of arms 24 which have portions thereof coupled to the roller 20 by a pin 30. The arms 24 are coupled to each other at one end thereof by a hand grip 26 and pin or bolt 28. The arms 24 of the roller arm 22 are also pivotably mounted to the roller support member 14 at the other ends thereof by a bolt 32 which extends through the roller support member. The bolt 32 allows the roller arm 22 to be pivoted to move the roller 20 across the tracking surface 16 of the roller support member 14. A bar 33 is provided to keep the arms 24 from spreading apart when the arm 22 is pivoted. The roller arm 22 may also be formed of wood or other suitable light weight material.

A tongue 34 is mounted on the support member 14 between the tracking surface 16 and the roller 20. The tongue 34 has downwardly extending projections or teeth members 36 formed thereon which are aligned adjacent to and spaced from the upwardly extending projections 18. The tongue 34 is the same width as the roller support member 14 and roller 20 and may be 6 inches also. A pair of pins or stops 35 are provided in each side of roller support member 14 to define or limit the path of movement of the Roller arm 22.

A cup or contained 38 is mounted on the base 12. The container 38 is aligned beneath the projections 36 and 18 to reciever crab meat as it is removed from the crab.

This invention is designed to extract meat from a whole crab 40 as is illustrated in FIG. 2. However before the meat is extracted from the crab 40 the crab is cut into two halves 42 and 44 along the longitudinal axis 46 of the body of the crab. The crab 40 is then cleaned of unedible parts which are exposed by the cut. The claws and legs 49 are then removed and the crab 40 (FIG. 3) is ready to be placed in the crab meat extracting device 10.

When utilizing the crab meat extracting device 10 the crab halves 42 and 44 are placed between the tongue 34 and the tracking surface 16 of the roller support member 14 as illustrated in FIG. 4. The roller arm 22 is then pivoted to move the roller in a counter clockwise direction to the position illustrated by the dotted lines in the Fig. When the roller 20 is moved to this position it causes the tongue 34, projections 36, tracking surface 16 and projections 18 to cooperate with the roller to push meat from the crab halves 42 and 44 into the container 38.

A second embodiment of the invention is illustrated in FIGS. 5 and 6. The crab meat extracting device 100 illustrated in FIG. 5 is designed to extract meat from a half crab. The crab meat extracting device 100 is constructed of the same material and is simular in design to the first embodiment of the invention.

The crab meat extracting device 100 includes a base 110 having a roller support member 114 coupled thereto. The roller support member 114 also includes a semi-circular tracking surface 116 formed thereon. The roller support member 114 may have a width for example of 3¾ inches. A plurality of upwardly extending projections 118 are provided on the tracking surface 116. A roller 120 is pivotably mounted by a roller arm 122 adjacent to the tracking surface 116. The roller 120 is the same width as the roller support member and maybe for example 3¾ inches. The roller arm 122 is formed of arms 124 which are coupled to each other by a handle 126 and pin 128. The arm 124 of the roller arm 122 are coupled to the roller 120 by a pin 130. Additionally the arms 124 and a bolt 132 which extends through the roller support 114, mount the roller 120 for pivotable movement on the tracking surface 116.

A tongue 134 having downwardly extending projections 136 formed therein is coupled to the tracking surface 116. The tongue 134 is coupled so that the downwardly extending projections 136 are aligned with and spaced from the upwardly extending projections 118.

A container 138 is a mountable on the base 112 beneath the projections 118 and 136 to receive crab meat as it is removed from the crab.

As previously noted this embodiment of the invention is designed to extract meat from a half crab 140 is cleaned and legs 142 removed to ready the crab for meat extraction (FIG. 7). The crab 140 can then be placed between the tongue 134 and tracking surface 116. The roller 120 can then be pivoted to squeeze the meat from the crab 140 into the container 138.

It is to be understood that other arrangements as well as various changes and modifications may be made by those skilled in the art without departing from the spirit and scope of the invention.

What is claimed is:

1. An apparatus for extracting meat from a crab including:
   a base member;
   a roller support member coupled to the base member;
   a semi-circularly extending tracking surface formed on the roller support member;
   a plurality of upwardly projecting members formed on the roller support member;
   a roller pivotably mounted adjacent to the tracking surface on the roller support member; and
   a plurality of downwardly projecting members mounted on the roller support member and in alignment with and spaced from the upwardly projecting members so that when the crab is placed in the space the roller can be pivoted to extract meat from the crab.

2. An apparatus for extracting meat from a crab as defined in claim 1 further including a means mounted on the base for receiving the crab meat as the meat is extracted from the crab.

3. An apparatus for extracting meat from a crab as defined in claim 2 wherein the crab meat receiving means is a container.

4. An apparatus for extracting meat from a crab as defined in claim 3 wherein the plurality of downwardly projecting members are formed on a rectangular support surface, the rectangular support surface being mounted to and spaced from the roller support member with the plurality of downwardly projecting members aligned with the plurality of upwardly projecting members.

5. An apparatus for extracting meat from a crab as defined in claim 4 further including a roller handle coupled to the roller and pivotable mounted to the roller support member to allow the roller to be pivoted along the tracking surface of the roller support member.

6. An apparatus for extracting meat from a crab as defined in claim 5 wherein the roller handle includes:
   a pair of arms, each one of the arms being coupled at an intermediate portion thereof to one side of the roller;
   a hand grip coupled between the arms at upper portions thereof; and
   a coupler extending through the roller support member to couple the arms at lower portions thereof to each other and mount the roller handle for pivotable movement on the roller support member.

* * * * *